United States Patent [19]

Rahn

[11] 4,453,317

[45] Jun. 12, 1984

[54] MAGNETIC COMPASS

[75] Inventor: Armin Rahn, Hamburg, Fed. Rep. of Germany

[73] Assignee: C. Plath KG, Hamburg, Fed. Rep. of Germany

[21] Appl. No.: 378,631

[22] Filed: May 17, 1982

Related U.S. Application Data

[63] Continuation of Ser. No. 161,417, Jun. 20, 1980, abandoned.

[30] Foreign Application Priority Data

Jun. 23, 1979 [DE] Fed. Rep. of Germany ....... 2925411

[51] Int. Cl.³ .............................................. G01C 17/08
[52] U.S. Cl. .......................................... 33/364; 33/346
[58] Field of Search ............. 33/348, 346, 364, 355 R; 220/4 B

[56] References Cited

U.S. PATENT DOCUMENTS

| 2,706,065 | 4/1955 | Stone | 220/4 B X |
|---|---|---|---|
| 2,745,642 | 5/1956 | Hermann | 220/4 B X |
| 3,069,783 | 12/1962 | Dinsmore | 33/364 |
| 3,261,103 | 7/1966 | Bosland et al. | 33/346 |
| 3,473,234 | 10/1969 | Kjellstrom et al. | 33/364 |
| 3,502,857 | 3/1970 | Cleveland | 33/348 X |
| 3,628,690 | 12/1971 | Sherman | 33/364 |
| 3,949,483 | 4/1976 | White | 33/364 |
| 4,004,348 | 1/1977 | Fowler et al. | 33/364 |
| 4,206,845 | 6/1980 | Christian | 220/4 B X |
| 4,250,627 | 2/1981 | Jarvenpaa et al. | 33/364 |

Primary Examiner—William D. Martin, Jr.
Attorney, Agent, or Firm—Elliott N. Kramsky

[57] ABSTRACT

A magnetic compass including a flexible bowl having a rim with an annular inwardly facing groove. The inwardly facing groove is adapted to engage a flange of a transparent cover in a tight sealing relationship, the combined assembly enclosing a compass rose.

10 Claims, 3 Drawing Figures

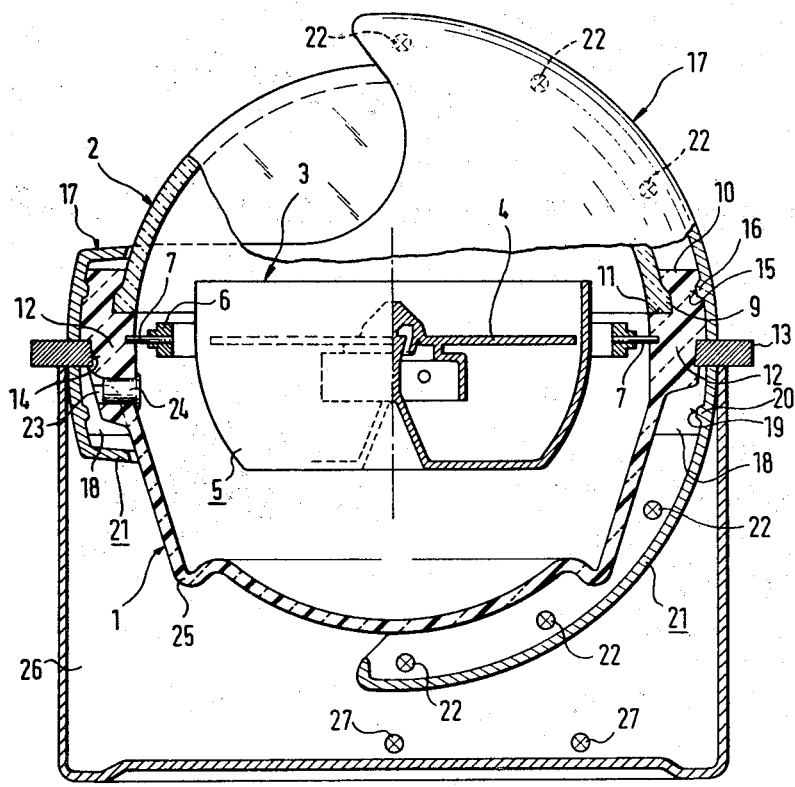

MAGNETIC COMPASS

This is a continuation of application Ser. No. 161,417, filed 6-20-80, now abandoned.

FIELD OF THE INVENTION

The invention relates to magnetic compasses of the type having a compass bowl, a transparent cover, such as a glass dome, whose rim can be tightly secured to the compass bowl, and structural supporting elements secured to the compass bowl, which elements may include, for examples, supporting elements for the compass rose and/or elements for assembly with a supporting structure, such as a housing and/or elements for assembly with a grid ring, also referred to as a course ring.

DESCRIPTION OF THE PRIOR ART

The manufacturing costs of a compass are, in essence, a function of the number of its components, of the accuracy in the machining of the components and of the manner in whcih they are assembled. Conventionally, the compass bowl constitutes the supporting structure for the compass, and therefore it is manufactured for rigid material, such as metal. This requires accurate machining for achieving tight assembly with the glass dome or other transparent cover and for assembly with structural elements which support the compass. Moreover, in most instances, a conventional compass bowl must be tightly assembled with a resilient compensating element which takes up dimensional changes, such as those of the filling fluid, and it must be provided with a tightly closed opening to permit filling the compass bowl. In the implementation of magnetic compasses known heretofore, a great number of threaded connections appeared thus unavoidable.

The invention provides a compass of the type mentioned above which exhibits a simplified construction and can, therefore, be manufactured with reduced costs, as compared to compass designs used heretofore.

SUMMARY OF THE INVENTION

As will be explained in more detail further below, the invention is based upon the recognition that a magnetic compass composed of a reduced number of parts and without threaed connections, whose manufacturing does not require high machining accuracy, can be designed under use of a flexible rim of the compass bowl, suitably of a compass bowl made substantially entirely of flexible material, instead of the rigid compass bowl construction used heretofore.

In accordance with a broad aspect of the invention, there is provided a magnetic compass comprising a compass bowl having a rim, a transparent cover removably and tightly sealed to the rim of the compass bowl and a compass rose assembly accommodated within the space enclosed by the compass bowl and the transparent cover, wherein the compass bowl rim, suitably substantially the entire compass bowl, is made of flexible material, thereby to permit assembling the compass bowl with the compass rose assembly and with the transparent cover by snapping action due to the resiliency of the flexible compass bowl.

Features of one embodiment of a magnetic compass in accordance with the invention include the provision of an annular, inwardly facing groove in the compass bowl rim for resiliently receiving an annular, outwardly facing flange of the transparent cover, and inwardly facing recesses within the rim of the compass bowl for receiving bearing pins supporting the compass rose assembly. Preferably, the compass bowl rim has a thickness which exceeds the thickness of at least a substantial portion of the remainder of the compass bowl material. As an alternative feature, a metal ring received in the internally facing surface of the compass bowl rim may be provided and cooperate with the bearing pins for supporting the compass rose assembly.

Moreover, at least one outwardly facing groove may be provided in the compass bowl rim for resiliently receiving a ring-shaped supporting element under snapping action, which may be a grid provided with markings. Suitably, additional, outwardly facing grooves in the compass bowl rim are provided for resiliently receiving portions of a housing under snapping action. The material selected for the compass bowl and the shielding container for the compass rose assembly may be light-transmissive, so that at least one light source below the compass rose assembly can be used to illuminate the compass rose from below.

Since at least the rim of the compass bowl is flexible and susceptible of dimensional changes, it need not be tightly assembled with an additional membrane permitting expansion, such as expansion of a filling fluid. Originally, it was to be feared that a compass bowl made of flexible material would not permit rigid and accurate assembly with a supporting structure and also would not permit safe and reliable assembly with the bearings for the compass rose. These considerations, though they appeared to be well founded, were overcome by the fact that the supporting elements, such as those for assembly with the supporting structure or for providing bearings for the compass rose, are associated with the rim of the compass bowl which is secured to the transparent cover. As a result of assembly with the rigid cover, the rim of the compass bowl is reinforced, so that it retains its shape and is sufficiently rigid for all practical purposes, in spite of the use of flexible material. This effect may be increased by the feature that the compass bowl rim has an increased thickness, as compared to the remainder of the compass bowl which need not of necessity be entirely flexible.

In accordance with a specific feature of the invention resulting from the fact that the compass bowl is made of flexible material, assembly with the transparent cover is substantially simplified by the fact that the rim of the compass bowl has an inwardly projecting collar forming a groove which cooperates with the outwardly projecting flange of the cover by snapping action. As a result of the resilient stretching forces developed by the rim, the rim in which the groove is formed by the collar of the compass bowl is tightly urged toward the edge of the cover, thus achieving not only a rigid but also a tight assembly. In most instances, no further securing and sealing measures will be necessary. It may, however, be advantageous to improve the sealing effect by known elements, such as a sealing ridge provided along the rim of the compass bowl, or by adhesive and sealing means applied between the contacting surfaces of the compass bowl and the transparent cover, or by measn of a ring-shaped tightening clip extending around the rim of the compass bowl. Such tightening clip can increase the reliability of the seal, particularly when taking into account that the resiliency of the material for the compass bowl may be limited, or that the elasticity causing the tension within the rim can diminish with progressing time.

Due to the rigidity of the reinforced rim of the compass bowl, caused by the proximity of the edge of the cover, it is possible to provide recesses directly within the material of the compass bowl, which recesses serve as the bearings for the cardanic suspension of the compass rose. These recesses are suitably formed when the compass bowl is manufactured, so that subsequent further machining is not necessary. Contemporary shaping technology permits a high degree of accuracy with respect to the position and the dimensions of the recesses, so that satisfactory quality of the bearings can be achieved without difficulties. This applies for the case where a bearing pin must be rotatably received within a recess in the compass bowl, but this is also applicable for the reverse condition, namely when the bearing pin must be rigidly mounted within the recess. Therefore, it is not normally necessary to provide distinct bearings within the recess of the compass bowl, even though this possibility would fall within the scope of the invention.

The flexibility of the compass bowl also leads to advantageous aspects in connection with the step of assembling the compass bowl with the cardanic suspension system of the compass rose. Even when this system is rigid and provided with a solidly secured bearing pin, it is possible to assemble the system with the compass bowl by virtue of the stretchability of the compass bowl, or at least its rim.

Whenever it is desirable that, for some reason, the cardanic suspension system of the compass rose must be supported in the compass bowl by a rigid ring, the invention provides for the possibility that such rigid ring is accommodated within an internally facing, peripheral groove of the rim of the compass bowl. Such rigid ring is then supported by the flexible material of the compass bowl rim without the use of threaded elements and without a need for accurate shapes of the mating parts.

Thus, assembling the compass bowl with external supporting structures does not only not create any problem by virtue of the reinforcing effect which the edge of the cover exerts upon the rim of the compass bowl, but this feature also leads to specific advantages. In accordance, with one of the features of an embodiment of the invention, it is possible to provide the rim of the compass bowl in the area close to the transparent cover with a peripheral groove around its outer surface, which groove receives a supporting ring under snapping action. In this manner, a satisfactory and reliable connection is achieved without a need for threadable engagement of elements to be interconnected and without a need for narrow manufacturing tolerances. Assembly is extremely simple. Suitably, the groove for receiving the supporting ring is actually offset with respect to the edge of the transparent cover, so that the compass bowl material is sufficiently flexible in a radially inward direction to permit snapping action when assembling it with the supporting ring.

A peripheral groove can be provided on the outer surface of the compass bowl for receiving a grid ring, with the measurements being selected such that the grid ring can be rotated with respect to the compass bowl and thereby its orientation adjusted and that it is still sufficiently rigidly maintained in any selected orientation. The grid ring and the supporting ring may constitute one integral component.

Additional grooves may be provided in the outer surface of the rim of the compass bowl for receiving further components of the compass, such as portions of a housing. These components may include a shield upon the upper side of the compass which protects a portion of the compass and/or has for its purpose the accommodation of light sources. Alternatively, these component may include a housing portion at the lower side of the compass which can also, or instead, be provided with light sources, it then being necessary that the compass bowl material, or at least its bottom portion, is light transmissive. This feature permits illumination of the compass rose from below by very simple means.

No threaded plug will be needed for closing the opening used for filling the compass bowl, because the invention permits using a plug, which due to the resiliency of the compass bowl material, snaps into the opening and thus guarantees a sufficiently reliable sealing effect.

The compass rose may be accommodated within a container which is closed at all sides and at the bottom. Since the compass bowl is suitably made entirely of flexible material, the container can perform swinging motion and transfer this motion to the liquid. This will, however, not affect the compass rose, because it is shielded by the container.

BRIEF DESCRIPTION OF THE DRAWINGS

The invention will become better understood from the following detailed description of one embodiment thereof, when taken in conjunction with the drawings, wherein:

FIG. 1 is an axially taken sectional view of a magnetic compass constructed in accordance with the invention; and FIGS. 2 and 3 are partial sectional views through the area of the rim of the compass bowl and the edge of the transparent cover in accordance with alternative embodiments.

DETAILED DESCRIPTION OF A PREFERRED EMBODIMENT

The compass bowl 1 and the transparent cover, which, in the illustrated embodiment, is a glass dome 2 together form a closed compass container which is filled with a liquid and contains a compass rose assembly 3. The compass rose 4, or compass card, is rotatably supported in the cardanic suspension container 5 which encompasses the rose 4 along all sides and at the bottom and whose height exceeds that of the rose 4, with the entire system referred to as the compass rose assembly. As a result, the rose is sufficiently shielded from turbulences in the liquid which could be caused by swinging motion of the compass bowl. The cardanic suspension container 5 is hinged to a gimbal ring 6 to permit pivoting motion about an axis which is oriented at right angles with the plane of the drawing paper. The gimbal ring 6, in turn, is supported by bearings in the form of pins 7 received in corresponding recesses of the compass bowl rim 12, whose thicknesses exceeds the thickness of at least a substantial portion of the remainder of the compass bowl material.

As shown in FIG. 3, a second gimbal ring 8 can be added which is then supported for pivoting motion about an axis which is oriented at right angles to the plane of the drawing paper and permits oblique orientation of the compass, for example for bulkhead mounting.

The glass dome 2 carries along its edge an outwardly protruding flange 9. This flange has its outer side encompassed by a collar 10 of the compass bowl, inasmuch as the collar defines an annular, inwardly facing groove in the compass bowl rim 12 for resiliently receiving the annular, outwardly facing flange 9 of the transparent cover. The dimensions of the collar 10 as well as its axial distance from the lateral groove surface 11 of the compass bowl are selected such that these portions surround the flange 9 of the glass dome under the application of resilient forces. The flange 9 and the groove in which it is received do not only maintain these elements in their relative position, but they also form a seal. Sealing ridges can additionally be provided within the area of the surface 11. Moreover, adhesive or sealing materials may be enclosed between these surfaces.

The rim of the compass bowl is shown as the area 12 of the compass bowl of a thickness which is greater than that of the remaining portions of the compass bowl. This area 12 constituting the rim of the compass bowl is relatively rigid by virtue of it being reinforced by the flange 9 and also by virtue of its thickness. Therefore, it is suitable for supporting the compass rose assembly 3 as well as for assembly with the external supporting structure. For the last-mentioned purpose, there is provided a securing ring 13 which snaps into a groove 14 of the area or rim 12 with increased cross section. The internal surface of the ring 13 and the bottom surface of the groove 14 are of slightly conical, upwardly diverging shape, thereby to permit easy assembling, inasmuch as the securing ring 13 can slide easily over the lower limit of the groove. This area of the groove can then be deflected radially and inwardly because there is no rigid portion which would prevent if from inward displacement. Rather, the reinforcing flange 9 is rigidly offset with respect to the groove 14. In spite of this arrangement, the flange 9 and the securing ring 13 exert a common reinforcing effect upon the rim 12 of the compass bowl, inasmuch as one of them fortifies the rim from the inner side and the other fortifies the rim from the outer sdie. By the selection of proper dimensions it is possible to cause the rim 12 to be resiliently preloaded, or biased, against the two rigid elements, namely flange 9 and securing ring 13, thereby to increase its relative rigidity and thereby to increase the reliability of the connection with the glass dome 2 and the securing ring 13.

On its outer surface, the collar 10 is provided with a groove 15 which receives, under snapping action, a circular, internally protruding ridge 16 of a shield 17, thereby to secure the shield to the compass.

Below and radially externally of the compass bowl and its rim 12, there is provided a plurality of ribs 18 occupying axial planes, and of which each is provided with one of recesses 19 which face radially outwardly. The recesses 19 form a circular groove, corresponding to the groove 15, which receives a circular protrusion 20 of a lower housing portion 21 whose shape may be identical with that of the shield 17. The shield 17 and the housing portion 21 are provided with light sources 22 which are suitably positioned below the compass in housing portion 21 for the purpose of illuminating the compass rose 4 through the light-transmissive compass bowl 1 and the cardanic suspension container 5, which then is also manufactured of light-transmissive material.

The compass bowl 1 has a filling opening 23 which can be closed by a plug 24. The plug is sealingly received in the opening as a result of elastic deformation. The compass bowl 1 may have its lower portion with a bellows-type cross-sectional configuration, in order to permit it to follow expansion and contraction of the filling medium. Suitably, the compass bowl is made of elastomeric material, such as polyurethane, which is suitably transparent and could be colored, its shore hardness being between 70 and 90, for example.

A cylindrical supporting structure 26 is fixed to the securing ring 13. The cross section of structure 26 can also be circularly symmetrical, in similarity with that of the glass dome 2 and of the compass bowl 1. When such cylindrical supporting structure is used, the lower housing portion 21 can be omitted. Then, the light sources can be mounted in the cylindrical supporting structure, as shown at 27.

When the securing ring 13 is seated upon the rim of the compass bowl under only slight preload condition, so that it can be rotated with respect to the rim, the securing ring 13 can be used as a grid ring, or course ring. For this purpose, it will be provided with corresponding marks upon its upper surface. Alternatively, a distinct grid ring can obviously be received in a peripheral groove of the compass bowl rim in a similar manner.

FIG. 2 illustrates the possibility of supporting the cardanic suspension system not directly by the rim 12 of the compass bowl, but by means of a separate rigid ring 28 which is received in a correspondingly shaped groove of the compass bowl and is retained in the groove as a result of the preload condition caused by the resiliency of the compass bowl material.

In FIG. 3 there is indicated at 29 a clip which urges the collar 10 forcedly over the flange 9. The clip may consist of a peripherally extending stretched tape or wire or a similar element.

It is to be noted that many modifications can be made by substitutions or additions, under use of equivalents for features disclosed herein, with such changes falling within the scope of the invention as defined by the appended claims.

I claim:
1. A magnetic compass comprising:
   a compass bowl of flexible material having a rim whose thickness exceeds that of the remainder of the bowl, said rim being provided with an annular, inwardly facing groove;
   a transparent rigid cover having an annular, outwardly facing flange;
   said groove and said flange being arranged so that said flange is resiliently received in said groove to form a tight sealing relationship between said bowl and said cover;
   a compass rose assembly within the sealed region enclosed by the compass bowl and the transparent cover; and
   said rim additionally including at least one outwardly facing annular groove adapted to resiliently recieve a ring shaped supporting element under snapping action.
2. A magnetic compass as defined in claim 1 wherein said remainder of said bowl further comprises an expandable region integral with said rim for receiving a liquid.
3. A magnetic compass as defined in claim 1 wherein said outwardly facing annular groove in said rim is offset with respect to said intwardly facing groove.
4. Magnetic compass according to claim 1, claim 2 or claim 3, comprising inwardly facing recesses within the rim of the compass bowl for receiving bearing pins supporting the compass rose assembly.

5. Magnetic compass according to claim 1, comprising a metal ring received in the internally facing surface of the compass bowl rim, the metal ring cooperating with bearing pins for supporting the compass rose assembly.

6. Magnetic compass according to claim 1, wherein the ring-shaped supporting element is a grid ring provided with markings.

7. Magnetic compass according to claim 1, comprising additional, outwardly facing grooves in the compass bowl rim for resiliently receiving portions of a housing under snapping action.

8. Magnetic compass according to claim 1, comprising a plug which resiliently snaps into an opening in the compass bowl rim.

9. Magnetic compass according to claim 1, comprising a shielding container for the compass rose assembly.

10. Magnetic compass according to claim 9, wherein the material for the compass bowl and the shielding container for the compass rose assembly is light-transmissive, there being at least one light source provided below the compass rose assembly.

* * * * *